US012599977B2

(12) United States Patent
Baba et al.

(10) Patent No.: US 12,599,977 B2
(45) Date of Patent: Apr. 14, 2026

(54) END MILL

(71) Applicant: MOLDINO TOOL ENGINEERING, LTD., Tokyo (JP)

(72) Inventors: Makoto Baba, Yasu (JP); Takafumi Sai, Yasu (JP)

(73) Assignee: MOLDINO Tool Engineering, Ltd., Tokyo (JP)

( * ) Notice: Subject to any disclaimer, the term of this patent is extended or adjusted under 35 U.S.C. 154(b) by 506 days.

(21) Appl. No.: 18/028,842

(22) PCT Filed: Sep. 28, 2020

(86) PCT No.: PCT/JP2020/036650
§ 371 (c)(1),
(2) Date: Mar. 28, 2023

(87) PCT Pub. No.: WO2022/064699
PCT Pub. Date: Mar. 31, 2022

(65) Prior Publication Data
US 2023/0330758 A1 Oct. 19, 2023

(51) Int. Cl.
B23C 5/10 (2006.01)
B23P 15/34 (2006.01)

(52) U.S. Cl.
CPC ............... B23C 5/10 (2013.01); B23P 15/34 (2013.01)

(58) Field of Classification Search
CPC ... B23C 2210/54; B23C 2210/64; B23C 5/10; B23C 5/1009; B23C 5/00; B23C 2200/32; B23B 2251/40; B23B 2251/406
See application file for complete search history.

(56) References Cited

U.S. PATENT DOCUMENTS 5,855,458 A * 1/1999 Reynolds ................ B23C 5/006
407/53
2014/0133926 A1* 5/2014 Budda ....................... B23C 5/10
407/54
2015/0147127 A1* 5/2015 Shpigelman .............. B23C 5/10
407/54

FOREIGN PATENT DOCUMENTS

CN 101318303 A 12/2008
EP 3272446 A1 1/2018
JP 2006-015418 A 1/2006
JP 2007-296588 A 11/2007
(Continued)

OTHER PUBLICATIONS

Supplementary European Search Report mailed Jun. 19, 2024, issued for European Patent Application No. 20955292.6.

*Primary Examiner* — Nicole N Ramos
(74) *Attorney, Agent, or Firm* — Troutman Pepper Locke LLP

(57) ABSTRACT
An end mill includes: at a distal end portion side in a rotation axis direction of a tool body, a plurality of cutting edges continuous from a center side to an outer peripheral side in a radial direction and adjacently arranged in a rotation direction of the tool body; gashes formed on front sides in a rotation direction of the respective cutting edges; and chip discharge flutes continuous with the gashes. The gashes are composed of distal end side depressed faces formed along a distal end side axis making an acute angle with the rotation axis and rear side depressed faces formed along a rear side axis making a smaller acute angle with the rotation axis than the distal end side axis. The distal end side depressed faces and the rear side depressed faces are formed to have shapes overlapping with one another.

6 Claims, 9 Drawing Sheets

(56) References Cited

FOREIGN PATENT DOCUMENTS

| | | |
|---|---|---|
| JP | 2012-157957 A | 8/2012 |
| WO | 2016/152611 A1 | 9/2016 |
| WO | 2017/038763 A1 | 3/2017 |
| WO | 2019/176452 A1 | 9/2019 |

* cited by examiner

END MILL

TECHNICAL FIELD

The present invention relates to an end mill having a configuration that improves chip dischargeability to a chip discharge flute through a gash positioned on a front side in a rotation direction of each of a plurality of cutting edges while ensuring certain rigidity at a distal end portion of a tool body.

BACKGROUND ART

Chips cut off by cutting edges, such as end cutting edges, of an end mill are discharged to chip discharge flutes via gashes formed continuously on front sides in a rotation direction of cutting edge rake faces. Since the gashes are formed, rigidity at a distal end portion of the end mill is likely to decrease relatively more than rigidity at sections where the chip discharge flutes are formed. Therefore, suppressing the decrease in the rigidity at the distal end portion is an object for manufacturing the end mill.

The decrease in the rigidity at the distal end portion can be suppressed to some extent by, for example, forming gashes in two tiers at a distal end portion side and a rear side and making an angle between gash faces of the respective gashes so that a boundary line of the two-tier gashes becomes convex on a surface side (see Patent Documents 1 and 2). In this case, since the boundary line between the gashes is convex, wall thickness of parts of a tool body where the gashes are formed increases more than a case where the boundary line is depressed, making it easier to ensure the rigidity.

However, in Patent Documents 1 and 2, since surfaces of the respective gashes have a planar shape (paragraph 0017 and FIG. 1 of Patent Document 1 and FIG. 3 of Patent Document 2), chip capacities of the respective gashes themselves are not high. As a result, if chips exceeding the chip capacities in the respective gashes is generated, clogging may occur.

In contrast to this, since forming two-tier gashes in front of end cutting edges in a depressed curved surface shape (see Patent Document 3) increases volumes of the respective gashes, chip capacities in the respective gashes is expected to be enhanced (paragraphs 0020 and 0040 of Patent Document 3).

Patent Document 1: JP-A-2006-15418 (claim 1, Paragraphs 0011 to 0019, FIG. 1, FIG. 2)
Patent Document 2: JP-A-2007-296588 (claim 1, Paragraphs 0006 to 0008, FIG. 1, FIG. 2)
Patent Document 3: WO 2016/152611 (claim 1, Paragraphs 0010 to 0047, FIG. 2 to FIG. 4)

DISCLOSURE OF THE INVENTION

Problems to be Solved by the Invention

However, even when the shapes of the respective gash surfaces are formed in a depressed curved surface shape to increase the chip capacities in the respective gashes as disclosed in Patent Document 3, a problem (possibility) still remains in the chip dischargeability of the gashes in this configuration.

Focusing on a flow of chips in adjacent gashes in consideration of the above-described background, the present invention proposes an end mill having a configuration that allows a distal end portion of a tool body to possess certain rigidity and improves chip dischargeability to a chip discharge flute through a gash positioned on a front side in a rotation direction of each of a plurality of cutting edges.

Solutions to the Problems

An end mill of the invention according to claim 1 includes: at a distal end portion side in a rotation axis direction of a tool body, a plurality of cutting edges continuous from a center side to an outer peripheral side in a radial direction when the distal end portion is viewed from a distal end face side in the rotation axis direction, the plurality of cutting edges being adjacently arranged in a rotation direction of the tool body; a gash formed on a front side in a rotation direction of each of the cutting edges; and a chip discharge flute continuous from the gash to a rear side in the rotation axis direction. The gash includes a distal end side depressed face formed along a distal end side axis making an acute angle with the rotation axis, and a rear side depressed face adjacent to the rear side in the rotation axis direction of the distal end side depressed face and formed along a rear side axis making a smaller acute angle with the rotation axis than the distal end side axis, and the distal end side depressed face and the rear side depressed face have shapes overlapping with one another.

The "distal end face" of "when the distal end portion is viewed from a distal end face side in the rotation axis direction (axial direction)" in claim 1 refers to an end face when an end mill main body (tool body) illustrated in FIG. 1 and FIG. 4 is viewed from a distal end side toward a shank 3 side on an opposite side of a rotation axis O. Hereinafter, a "rotation axis O direction" is also simply referred to as the "axial direction," and the "distal end face" is also simply referred to as an "end face". The "distal end portion" is a cutting edge portion 2.

The "cutting edges" in claim 1 are mainly end cutting edges 4 continuous from the center side to the outer peripheral side in the radial direction when the distal end portion of the tool body is viewed from the distal end face side and include corner radius edges 5 in a case of being continuous with an outer peripheral side in a radial direction of the end cutting edges 4. Peripheral cutting edges 6 are continuous with an outer peripheral side of the corner radius edges 5. When the end cutting edges 4 have the corner radius edges 5, an end mill 1 becomes a radius end mill as illustrated. When the peripheral cutting edges 6 are continuous with the outer peripheral side of the end cutting edges 4 without the corner radius edges 5, the end mill 1 becomes a square end mill.

As illustrated, in some cases, the end cutting edges 4 are classified into long cutting edges and short cutting edges. In the long cutting edges, end portions at a center side in the radial direction of the end cutting edges 4 are positioned relatively closer to the center. In the short cutting edges, end portions at the center side of the end cutting edges 4 are positioned on the outer peripheral side in the radial direction with respect to the end portions of the long end cutting edges that are closer to the center. In other cases, the end cutting edges 4 are not classified. In any case, the end cutting edges 4 (cutting edges) are formed so as to become paired or point-symmetric with respect to the rotation axis (radial direction center) O. Therefore, the number of the end cutting edges 4 (number of pieces) is mainly four (pieces), but is more than four in some cases. The drawings illustrate an example of a radius end mill with four cutting edges, which has both two long cutting edges (long end cutting edges 41) and two short cutting edges (short end cutting edges 42), and the corner radius edges 5 continuous with the end cutting edges 4. Hereinafter, the radial direction center O is also referred to as a center O or the rotation axis O. The reference numeral 4 denoting the end cutting edges includes the reference numeral 41 denoting the long end cutting edges and the reference numeral 42 denoting the short end cutting edges in the drawings. The "gash formed on a front side in a rotation direction of each of the cutting edges adjacently arranged in a rotation direction of the tool body" in claim 1 means that the gash is positioned on the front side in the rotation direction of each of the end cutting edges 4 (cutting edges). The "chip discharge flute continuous from the gash to a rear side in the rotation axis direction" means that a chip discharge flute 7 is continuous with the rear side in the rotation axis direction of the gash. The "rear side in the rotation axis direction" refers to a rear side (shank 3 side) when the tool body is viewed in the rotation axis O direction.

The "gash includes a distal end side depressed face and a rear side depressed face" means that the gashes have two faces of distal end side depressed faces 8, 9 and rear side depressed faces 10, 11 and include transition faces 12, 13 from the distal end side depressed faces 8, 9 to the rear side depressed faces 10, 11. The "transition faces 12, 13" refer to a portion indicated by a curved line on an obtuse angle side of a part where a line L3 intersects with a line L4 in FIG. 7. The "gash formed on a front side in a rotation direction of each of the cutting edges" refers to a portion where the distal end side depressed face 8 and the rear side depressed face 10 are combined and a portion where the distal end side depressed face 9 and the rear side depressed face 11 are combined. The depressed face refers to a surface of the gash.

The "rear side depressed face adjacent to the rear side in the rotation axis direction of the distal end side depressed face" means that the rear side depressed faces 10, 11 are positioned on rear sides of the distal end side depressed faces 8, 9 when the tool body is viewed in the rotation axis O direction. When the distal end portion of the tool body is viewed from an end face side, the distal end side depressed faces 8, 9 are positioned on the center side in the radial direction, and the rear side depressed faces 10, 11 are positioned on the outer peripheral sides (chip discharge flute 7 sides) in the radial direction of the distal end side depressed faces 8, 9. The distal end side depressed faces 8, 9 are "distal end side gashes 8, 9" in an embodiment, and the rear side depressed faces 10, 11 are "rear side gashes 10, 11" in the embodiment. In the distal end side depressed faces 8, 9, a part of a cutting edge rake face is formed in some cases and is not formed in other cases. In the rear side depressed faces 10, 11, a part of a cutting edge rake face is formed.

The cutting edges (end cutting edges 4) and the peripheral cutting edges 6 are formed from the distal end portion side to the rear side of the tool body, and the gashes are also formed from the distal end portion side to the rear side of the tool body. In this relation, the distal end side depressed faces 8, 9 positioned on the center side in the radial direction are positioned on the distal end portion side of the tool body when viewed in the axial direction of the tool body. The rear side depressed faces 10, 11 positioned on the outer peripheral side in the radial direction are positioned on the rear side (shank 3 side) of the tool body. The rear side depressed faces 10, 11 are formed on the chip discharge flute 7 sides of the distal end side depressed faces 8, 9. Therefore, chips in the respective distal end side depressed faces 8, 9 enter (move) into the respective rear side depressed faces 10, 11 positioned on the outer peripheral sides in the radial direction of the respective distal end side depressed faces 8, 9, and the chips in the respective rear side depressed faces 10, 11 are discharged to the chip discharge flutes 7. The rear side depressed faces 10, 11 communicate with the distal end side depressed faces 8, 9 and the chip discharge flutes 7.

The "acute angle" of a "distal end side axis P1 making an acute angle with the rotation axis O" in claim 1 refers to an angle θ1 on an acute angle side, not on an obtuse angle side, when it is supposed that the distal end side axis P1 intersects with the rotation axis O or when the distal end side axis P1 is viewed such that it intersects with the rotation axis O. The distal end side axis P1 intersects with the rotation axis O or its extended line in some cases and does not intersect (is in a twisted position) in other cases. The "acute angle" of a "rear side axis P2 making a smaller angle with the rotation axis O than the distal end side axis P1" also refers to an angle θ2 on an acute angle side when it is supposed that the rear side axis P2 intersects with the rotation axis O or when the rear side axis P2 is viewed such that it intersects with the rotation axis O. The rear side axis P2 also intersects with the rotation axis O or its extended line in some cases and does not intersect (is in a twisted position) in other cases. The distal end side axis P1 and the rear side axis P2 are basically straight lines.

The "distal end side depressed face formed along a distal end side axis" means that the distal end side depressed faces 8, 9 keep a distance from the distal end side axis P1, and straight lines when it is supposed that they are on the depressed faces and the distal end side axis P1 are, for example, in a parallel or nearly parallel state. The "depressed face" is mainly a depressed curved surface and includes a planar surface. Similarly, the "rear side depressed face formed along a rear side axis" means that the rear side depressed faces 10, 11, for example, keep a certain distance from the rear side axis P2.

The "distal end side depressed faces 8, 9 and the rear side depressed faces 10, 11 have shapes overlapping with one another" in claim 1 means that when the distal end side depressed face 8 (9) and the rear side depressed face 10 (11) are each extracted and stacked, the respective depressed faces have shapes overlapping with one another without a gap. As long as the distal end side depressed face 8 (9) and the rear side depressed face 10 (11) have a portion overlapping with one another without a gap when both are stacked, one depressed face may have a portion extending (protruding) from the overlapping portion with the other depressed face on an extension face of the one depressed face. The depressed face includes a combination of a curved surface and a planar surface.

In other words, it means that a cross-sectional shape (curved line) of the distal end side depressed face 8 (9) on a planar surface perpendicular to an axis identifying a moving direction when a depressed line (depressed curved line) as a reference of the distal end side depressed face 8 (9) moves in parallel overlaps with a cross-sectional shape (curved line) of the rear side depressed face 10 (11) on a planar surface perpendicular to an axis identifying a moving direction when a depressed line (depressed curved line) as a reference of the rear side depressed face 10 (11) moves in parallel. As long as one depressed line and the other depressed line have a portion overlapping with one another when stacked, the one depressed line may have a portion extending (protruding) from the overlapping portion with the other depressed line on an extension line of the one depressed line. The depressed line includes a combination of a curved line and a straight line.

In other words, it means that the distal end side depressed face 8 (9) and the rear side depressed face 10 (11) continuous with the distal end side depressed face 8 (9) on the outer peripheral side in the radial direction form curved surfaces having an identical shape. Specifically, irrespective of whether or not there is a difference in configuration between the distal end side depressed face 8 and the rear side depressed face 10 and between the distal end side depressed face 9 and the rear side depressed face 11, the shape (curvature and change in curvature) in a circumferential direction of the distal end side depressed face 8 and the shape (curvature and change in curvature) in a circumferential direction of the rear side depressed face 10 have an equal shape.

"There is a difference in configuration between the distal end side depressed faces 8, 9 and the rear side depressed faces 10, 11" means that there is a difference in, for example, depth, length, or inclination in a radial direction between the distal end side depressed face 8 and the rear side depressed face 10 and between the distal end side depressed face 9 and the rear side depressed face 11. For example, it means that there is a difference between the depth of the distal end side depressed face 8 (9) and the depth of the rear side depressed face 10 (11), that there is a difference between the length in the distal end side axis P1 direction of the distal end side depressed face 8 (9) and the length in the rear side axis P2 direction of the rear side depressed face 10 (11), or that there is a difference in inclination in the axial direction or inclination in the circumferential direction between the distal end side depressed face 8 (9) and the rear side depressed face 10 (11). Furthermore, for example, it means that the end cutting edges 4 are classified into the long end cutting edges 41 and the short end cutting edges 42, and there is a difference in length between the end cutting edges 4 (long end cutting edges 41) formed on a rear side in the rotation direction of the distal end side depressed face 8 or the rear side depressed face 10 and the end cutting edges 4 (short end cutting edges 42) formed on the rear side in the rotation direction of the distal end side depressed face 9 or the rear side depressed face 11.

"Form curved surfaces having an identical shape" means that a part of any one of the distal end side depressed face 8 (9) and the rear side depressed face 10 (11) overlaps with a part of the other in FIG. 6 illustrating a case where it is supposed that the distal end side depressed face 8 (9) and the rear side depressed face 10 (11) form, for example, a part of a cylindrical surface. An overlapping region is in a circumferential direction and a cylindrical axis direction of the cylindrical surface. In some cases, a depressed face having a smaller region area of any of the distal end side depressed face 8 (9) and the rear side depressed face 10 (11) overlaps with a depressed face having a larger region area, and the depressed face having a larger region area has a region with which the depressed face having a smaller region area does not overlap.

For example, in FIG. 6, if one of strip-shaped regions indicated by thin solid lines that are trajectories when a line (curved line) L1 and a line (curved line) L2 indicated by thick solid lines move in parallel along the distal end side axis P1 and the rear side axis P2 respectively is any one of the distal end side depressed face 8 (9) and the rear side depressed face 10 (11), the other is a strip-shaped region including this strip-shaped region. The one strip-shaped region and the other strip-shaped region are completely matched in some cases.

A curved surface of the thin line indicating the trajectory when the curved line L1 indicated by the thick line in FIG. 6 moves in parallel along the distal end side axis P1 while keeping a certain distance from the distal end side axis P1 is a part of a side surface of a column as a cylindrical surface, and this curved surface virtually represents the distal end side depressed faces 8, 9. A curved surface of the thin line indicating the trajectory when the curved line L2 indicated by the thick line in FIG. 6 moves in parallel along the rear side axis P2 while keeping a certain distance from the rear side axis P2 is a part of a side surface of a column as a cylindrical surface, and this curved surface virtually represents the rear side depressed faces 10, 11.

The curved surfaces indicated by the thin solid lines in FIG. 6 are curved surfaces formed when a rotator Q that is a grinding tool, for example, moves in parallel in directions (directions of the generating lines L3, L4) inclined with respect to the rotation axis O as described below. Since the curved surfaces form surfaces of the distal end side depressed faces 8, 9 and surfaces of the rear side depressed faces 10, 11, the surfaces of the distal end side depressed faces 8, 9 and the surfaces of the rear side depressed faces 10, 11 form curved surfaces having identical shapes (claim 1). The "curved surfaces having identical shapes" means that the curved surfaces of the distal end side depressed faces 8, 9 and the curved surfaces of the rear side depressed faces 10, 11 have shapes that can overlap with one another. Any one of the curved surfaces is completely matched with the other curved surface in some cases while one curved surface forms a part of the other curved surface in other cases.

The line L1 is a line convex on the rear side (shank 3 side) of the tool body within a bottom surface on an upper side of the cylindrical surface (column) indicated by two-dot chain lines, which has the axis (distal end side axis) P1, in FIG. 6 and corresponds to a "line convex toward the rear side in the rotation axis direction of the tool body" described below (claim 5). The line L2 is a thick line convex toward the rotation axis O side within a bottom surface on an upper side of the cylindrical surface (column) indicated by two-dot chain lines, which has the axis (rear side axis) P2, and corresponds to a "line convex toward the rotation axis side" described below (claim 5). The line L2 can also be said to be a curved line convex toward the rear side of the tool body.

The cylindrical surfaces illustrated in FIG. 6 are merely examples of the curved surfaces formed by the surfaces of the distal end side depressed faces 8, 9 and the rear side depressed faces 10, 11. The curved surfaces include regular curved surfaces and irregular curved surfaces, and the shapes are arbitrary. The curved surfaces include planar surfaces. However, the surfaces of the distal end side depressed faces 8, 9 and the surfaces of the rear side depressed faces 10, 11 form curved surfaces having identical shapes (claim 1). Therefore, when the surfaces of the distal end side depressed faces 8, 9 are a part of the side surface of the column, the surfaces of the rear side depressed faces 10, 11 are also a part of the side surface of the column having an identical dimension.

Thus, specifically speaking, the distal end side depressed faces 8, 9 of claim 1 form curved surfaces when the line L1 convex toward the rear side in the rotation axis O direction of the tool body moves in parallel along the distal end side axis P1, which makes an acute angle with the rotation axis O, while keeping a certain distance from the distal end side axis P1 (claim 5). The rear side depressed faces 10, 11 form curved surfaces when the line L2 convex toward the rotation axis O side moves in parallel along the rear side axis P2, which makes a smaller acute angle with the rotation axis O than the distal end side axis P1, while keeping a certain distance from the rear side axis P2 (claim 5).

A direction in which the curved line L1 moves in parallel along the distal end side axis P1 is a direction of parallel movement when the rotator Q as the grinding tool moves in parallel. The "trajectory when the curved line L1 moves in parallel along the distal end side axis P1" is a track that the curved line L1 traces when moving in parallel. The curved surfaces formed by the distal end side depressed faces 8, 9 form curved surfaces convex toward the rear side of the tool body, and the surfaces themselves of the distal end side depressed faces 8, 9 form depressed curved surfaces. A direction in which the curved line L2 moves in parallel along the rear side axis P2 is also a direction of parallel movement when the rotator Q as the grinding tool moves in parallel. The curved surfaces formed by the surfaces of the rear side depressed faces 10, 11 form curved surfaces convex toward the rear side of the tool body or toward the rotation axis O side, and the surfaces themselves of the distal end side depressed faces 8, 9 form depressed curved surfaces.

When focusing on a point that the curved surfaces of the respective gashes are formed when the rotator Q that is the grinding tool moves in parallel as illustrated in FIG. 7, the acute angle θ2 is smaller than the acute angle θ1 (θ1>θ2) (claim 1). The acute angle θ1 is made by the generating line L3 of the curved surfaces (cylindrical surfaces) forming the distal end side depressed faces 8, 9 or the distal end side axis P1 with the rotation axis O. The acute angle θ2 is made by the generating line L4 of the curved surfaces forming the rear side depressed faces 10, 11 or the rear side axis P2 with the rotation axis O. When the distal end side depressed faces 8, 9 and the rear side depressed faces 10, 11 fulfill this requirement, compared with a case where this requirement is not provided, the distal end portion of the tool body (end mill) on which the distal end side depressed faces 8, 9 are formed has a relatively large core diameter, enhancing the rigidity of the distal end portion of the tool body. In this relation, a moving direction (P2) when the rotator Q forms the rear side depressed faces 10, 11 is closer to the rotation axis O direction than a moving direction (P1) when the rotator Q forms the distal end side depressed faces 8, 9. Note that while FIG. 6 and FIG. 7 illustrate a case where it is supposed that the distal end side depressed faces 8, 9 and the rear side depressed faces 10, 11 form part of the cylindrical surfaces, it is not always true that the distal end side depressed face 8 (9) and the rear side depressed face 10 (11) form part of the cylindrical surfaces.

The distal end side depressed face 8 (9) and the rear side depressed face 10 (11) form curved surfaces having an identical shape. Therefore, when the curved surfaces of the distal end side depressed faces 8, 9 and the curved surfaces of the rear side depressed faces 10, 11 are viewed in cross-sectional surfaces perpendicular to the generating lines L3, L4, the respective curved lines are identical in some cases while one curved lines are part of the other curved lines in other cases as illustrated in FIGS. 8(*a*) and 8(*b*). Note that although the cross-sectional shape of the distal end side depressed face 8 (9) perpendicular to the generating line L3 and the cross-sectional shape of the rear side depressed face 10 (11) perpendicular to the generating line L4 are ellipses in a precise sense, they are illustrated as circular cross-sectional surfaces for convenience in FIG. 8. FIG. 7 illustrates a relationship between the generating lines L3, L4 and the tool body when the rotator Q moves in parallel in two phases by changing an angle with the rotation axis O.

When the rotator Q approaches the rotation axis O side during the parallel movement, the curved lines (L1, L2) of gash cross-sectional surfaces become long. When the rotator Q recedes from the rotation axis O, the curved lines of the gash cross-sectional surfaces become short. The short curved line is a part of the long curved line. Therefore, one curved line L1 (L2) is a part of the other curved line L2 (L1) in some cases while they are identical in other cases, and one curved surface forms a part of the other curved surface in some cases while they are identical in other cases. The curved lines L1, L2 include straight lines.

The "curved surfaces indicated by the thin lines when the curved lines L1, L2 move in parallel along the axes P1, P2 while keeping certain distances from the axes P1, P2" described above can also be said to be part of the curved surfaces formed when the generating lines L3, L4 that keep distances from the axes P1, P2 rotate on the axes P1, P2 in the cylindrical surfaces illustrated in FIG. 6. Note that since the cylindrical surfaces illustrated in FIG. 6 are examples, it is not always true that the generating lines L3, L4 that move with reference to the axes P1, P2 are straight lines, and the generating lines L3, L4 may, for example, move in parallel with reference to the axes P1, P2.

The curved surfaces formed when the curved lines L1, L2 move in parallel along the axes P1, P2 are also curved surfaces formed when a surface of the rotator Q as the grinding tool illustrated in FIG. 7 for grinding the tool body to form the gashes in the tool body moves in parallel (while rotating around a rotation axis C of the rotator Q). Directions of the parallel movement at that time are the directions of the generating lines L3, L4.

When the curved surfaces forming the surfaces of the respective gashes are the curved surfaces formed by the parallel movement of the rotator Q illustrated in FIG. 7, the curved lines when a curved surface for the distal end side depressed faces 8, 9 illustrated in FIG. 8(*a*) and a curved surface for the rear side depressed faces 10, 11 illustrated in FIG. 8(*b*), which is continuous with the curved surface for the distal end side depressed faces 8, 9, are viewed in the cross-sectional surfaces perpendicular to the parallel movement directions have shapes overlapping when they are stacked. That is, when the curved line illustrated in FIG. 8(*a*) and the curved line illustrated in FIG. 8(*b*) are stacked, a total length of a shorter curved line ((b)) of the curved line illustrated in FIG. 8(*a*) and the curved line illustrated in FIG. 8(*b*) is a part of a longer curved line ((a)). The curved line for the distal end side depressed faces 8, 9 illustrated in FIG. 8(*a*) corresponds to the curved line L1 illustrated in FIG. 6, and the curved line for the rear side depressed faces 10, 11 illustrated in FIG. 8(*b*) corresponds to the curved line L2 illustrated in FIG. 6. In FIG. 6, the curved surfaces of the distal end side depressed faces 8, 9 are represented by the cylindrical surface having the generating line L3, and the curved surfaces of the rear side depressed faces 10, 11 are represented by the cylindrical surface having the generating line L4.

The curved line representing the distal end side depressed faces 8, 9 illustrated in FIG. 8(*a*) and the curved line representing the rear side depressed faces 10, 11 illustrated in FIG. 8(*b*) are combinations of lines in which on both sides in circumferential directions of part of circular arcs, curved lines having smaller curvatures than the circular arcs are connected and straight lines are connected beyond them. Middles in the circumferential directions of the respective circular arcs illustrated in FIGS. 8(*a*) and 8(*b*) are a line L5 and a line L6 described below (claim 4). The line L5 passes through deepest positions on the surfaces of the distal end side gashes 8, 9 and the line L6 passes through deepest positions on the surfaces of the rear side depressed faces 10, 11. Centers of the respective circular arcs (curvature centers) are the distal end side axis P1 and the rear side axis P2 illustrated in FIG. 6.

Here, when paying attention to Patent Document 3 described above, it is in a state where many sections in a radial direction of short end cutting edge rake faces (longitudinal direction of short end cutting edges) face chip discharge flutes when a distal end portion of a tool body is viewed from a distal end face side in a rotation axis O direction (FIG. 2). This reduces a core diameter of a portion closer to a distal end face of the tool body. Accordingly, rigidity of the distal end portion of an end mill against vibration is easily decreased.

In contrast to this, in the present invention, since the distal end side depressed faces 8, 9 and the rear side depressed faces 10, 11 are formed on the front sides in the rotation direction of the respective cutting edges, the chip discharge flutes 7 are not shaped to enter deeply closer to the center O of the distal end face. As a result, compared with Patent Document 3, volumes (chip pockets) of all the gashes decrease, and therefore the rigidity of the end mill 1 against vibration during cutting increases.

In addition, in the present invention, the acute angle θ2 is smaller than the acute angle θ1 (θ1>θ2). The acute angle θ1 is made by the distal end side axis P1 as a reference of the curved line L1 forming the distal end side depressed faces 8, 9 and the rotation axis O. The acute angle θ2 is made by the rear side axis P2 as a reference of the curved line L2 forming the rear side depressed faces 10, 11, and the rotation axis O. Accordingly, since a sum of the volumes of both gashes is smaller than that in a case where both angles θ1, θ2 are equal (θ1=θ2), a decrease in the rigidity can be suppressed. This means that the rigidity of the distal end portion of the tool body can be enhanced even when the sum of the volumes is identical. The angle θ1 is also an angle made by the generating line L3 forming the curved surfaces of the distal end side depressed faces 8, 9 and the rotation axis O. The angle θ2 is also an angle made by the generating line L4 forming the curved surfaces of the rear side depressed faces 10, 11 and the rotation axis O.

Additionally, the distal end side depressed faces 8, 9 and the rear side depressed faces 10, 11 form depressed curved surfaces having identical shapes (claim 1). Therefore, chips which are cut off from a work material by the cutting edges and enter into the distal end side depressed faces 8, 9 are easily guided to the rear side depressed faces 10, 11. The chips entering into the rear side depressed faces 10, 11 are easily guided to the chip discharge flutes 7. Therefore, discharge of the chips from the distal end side depressed faces 8, 9 to the rear side depressed faces 10, 11 and discharge of the chips from the rear side depressed faces 10, 11 to the chip discharge flutes 7 easily occur.

Specifically, the distal end side depressed faces 8, 9 and the rear side depressed faces 10, 11 are depressed curved surfaces having identical shapes. Therefore, magnitude of resistance that the chips moving (flowing) within the distal end side depressed faces 8, 9 receive from the distal end side depressed faces 8, 9 is equal to or comparable with magnitude of resistance that the chips moving within the rear side depressed faces 10, 11 receive from the rear side depressed faces 10, 11. As a result, it is difficult to make a difference in flow of the chips between the two depressed surfaces. Even after the chips move from the distal end side depressed faces 8, 9 to the rear side depressed faces 10, 11, traveling directions of the individual chips are aligned in the rear side depressed faces 10, 11. Therefore, it is difficult to obstruct courses between the chips. In other words, since movement distances of the individual chips until they move to the chip discharge flutes 7 are shortened, chip dischargeability of the entire gashes improves.

In particular, when the distal end side depressed faces 8, 9 and the rear side depressed faces 10, 11 are connected in continuous curved surfaces (claim 2), movement of the chips in the distal end side depressed faces 8, 9 to the rear side depressed faces 10, 11 and subsequent discharge to the chip discharge flutes 7 become even smoother. "Connected in continuous curved surfaces" means that convex boundary lines do not exist between the surfaces of the distal end side depressed faces 8, 9 and the surfaces of the rear side depressed faces 10, 11. To be described with a state during the parallel movement of the rotator Q, the "continuous curved surfaces" are formed by drawing a curved line illustrated as the transition faces 12, 13 in FIG. 7, instead of a straight line, by trajectories of movement when the parallel movement of the rotator Q for forming the distal end side depressed faces 8, 9 transitions to the parallel movement of the rotator Q for forming the rear side depressed faces 10, 11. The transition faces 12, 13 form curved surfaces convex toward a surface side on a vertical cross-sectional surface of the tool body.

Additionally, when the distal end side axis P1 and the rear side axis P2 as the references of the curved lines L1, L2 moving in parallel are positioned on an identical planar surface (claim 3), routes in which bottom portions of the surfaces of the distal end side depressed faces 8, 9 and the rear side depressed faces 10, 11 head from the center side toward the outer peripheral side in the radial direction when the distal end portion of the tool body is viewed from the distal end face side are in an identical straight line shape, and the movement distances of the chips are further shortened. Therefore, faster and smoother discharge of the chips is prompted. "Positioned on an identical planar surface" means that the distal end side axis P1 and the rear side axis P2 are on one planar surface, and means that when viewed in an in-plane direction of the planar surface, the distal end side axis P1 and the rear side axis P2 are positioned on an identical straight line. In this case, without limiting to the bottom portions of the surfaces of the respective gashes, even when paying attention to any portion other than the bottom portions, the routes in an identical straight line shape heading from the center side toward the outer peripheral side in the radial direction of the tool body are formed.

When the gashes are, for example, simply depressed curved surfaces as disclosed in Patent Document 3, the chips in each gash are discharged to a gash side adjacent to a chip discharge flute side or to the chip discharge flute side without taking a shortest way. When a boundary line 31 between a first gash 7 (equivalent to the distal end side depressed face) and a second gash 8 (equivalent to the rear side depressed face) of Patent Document 3 forms a ridgeline convex from depressed curved surfaces of the first gash 7 and the second gash 8 (paragraph 0038), chips in the first gash 7 move along the depressed curved surface (depressed curved line) of the first gash 7 to the boundary line 31, and then enter into the second gash 8 via the boundary line 31. Therefore, the distance to the boundary line 31 is not a shortest distance. When viewed in a cross-sectional surface passing through the rotation axis O of the tool body, the chips move along the depressed curved line in the first gash 7 and then cross over the boundary line 31.

In contrast to this, when the distal end side axis P1 and the rear side axis P2 are positioned on an identical planar surface (claim 3), irrespective of whether or not clear boundary lines appear between the distal end side depressed faces 8, 9 and the rear side depressed faces 10, 11, the chips in the distal end side depressed faces 8, 9 move on straight lines from the distal end side depressed faces 8, 9 to the boundary lines and enter into the rear side depressed faces 10, 11. Similarly, irrespective of whether or not clear boundary lines appear between the rear side depressed faces 10, 11 and the chip discharge flutes 7, the chips in the rear side depressed faces 10, 11 move on straight lines from the rear side depressed faces 10, 11 to the boundary lines and enter into the chip discharge flutes 7. The chips move on the straight lines, causing the chips in any space to move the shortest distance to transition to an adjacent space.

Irrespective of whether or not clear boundary lines appear between the distal end side depressed faces 8, 9 and the rear side depressed faces 10, 11, at least when the distal end side axis P1 and the rear side axis P2 are positioned on an identical planar surface (claim 3), the boundary lines do not become ridgelines convex from the surfaces of the distal end side depressed faces 8, 9 and the rear side depressed faces 10, 11. Therefore, since the chips in the distal end side depressed faces 8, 9 do not receive resistance from the boundary lines when passing the boundary lines, the chips can pass the boundary lines without resistance.

Furthermore, when the line L5 passing through the deepest positions (closer to the shank 3) on the surfaces of the distal end side depressed faces 8, 9 and the line L6 passing through the deepest positions (closer to the rotation axis O) on the surfaces of the rear side depressed faces 10, 11 are on an identical straight line (claim 4), movement of the chips in the distal end side depressed faces 8, 9 to the rear side depressed faces 10, 11 and subsequent discharge to the chip discharge flutes 7 become smoother, further improving discharge efficiency of the chips. The lines L5, L6 passing through the deepest positions on the surfaces of the gashes are substantially straight lines including lines passing through the deepest positions on the surfaces of the gashes.

The end mill described above is manufactured by moving a surface of the grinding tool in parallel along the distal end side axis P1 to form the distal end side depressed faces 8, 9 while rotating the grinding tool that is the rotator Q around the rotation axis C of the rotator Q with respect to the columnar tool body, and moving the surface of the grinding tool in parallel along the rear side axis P2 to form the rear side depressed faces 10, 11 while keeping the rotating of the grinding tool around the rotation axis C of the rotator Q (claim 6).

Effects of the Invention

The distal end side depressed faces are formed on the center side in the radial direction on the front side in the rotation direction of the cutting edges, the rear side depressed faces are formed on the chip discharge flute side of the distal end side depressed faces, and the distal end side depressed faces and the rear side depressed faces are formed to have shapes overlapping with one another. Therefore, the chips which are cut off from the work material by the cutting edges and enter into the distal end side depressed faces are easily guided to the rear side depressed faces, and the chips entering into the rear side depressed faces are easily guided to the chip discharge flutes. In particular, a flow of the chips passing through the distal end side depressed faces and a flow of the chips passing through the rear side depressed faces are aligned, and the chips smoothly flow without mutually obstructing the courses. Therefore, the chips can be promptly discharged to the chip discharge flutes.

Additionally, the acute angle made by the rear side axis as a reference of the curved lines forming the curved surfaces of the rear side depressed faces and the rotation axis is smaller than the acute angle made by the distal end side axis as a reference of the curved lines forming the curved surfaces of the distal end side depressed faces and the rotation axis. Accordingly, accumulation of the chips in the distal end side depressed faces is restrained even for a shape in which the volumes of the distal end side depressed faces are relatively smaller than the volumes of the rear side depressed faces. Therefore, the chip dischargeability can be improved compared with a conventional one while the rigidity of the distal end portion of the tool body is maintained.

DESCRIPTION OF PREFERRED
EMBODIMENTS

Figure 1:
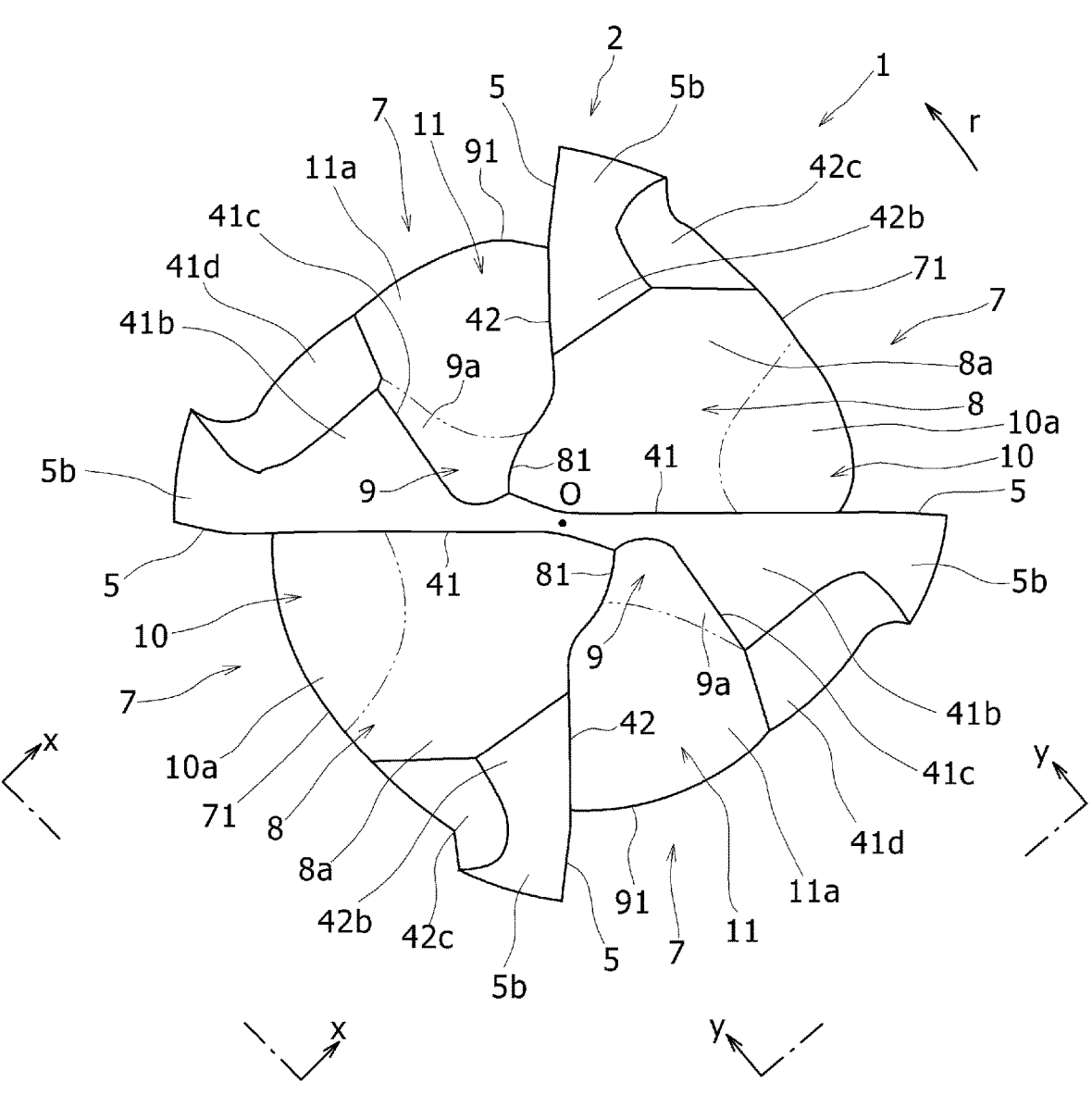
FIG. 1 is an end view illustrating a distal end face of an end mill.
Figure 2:
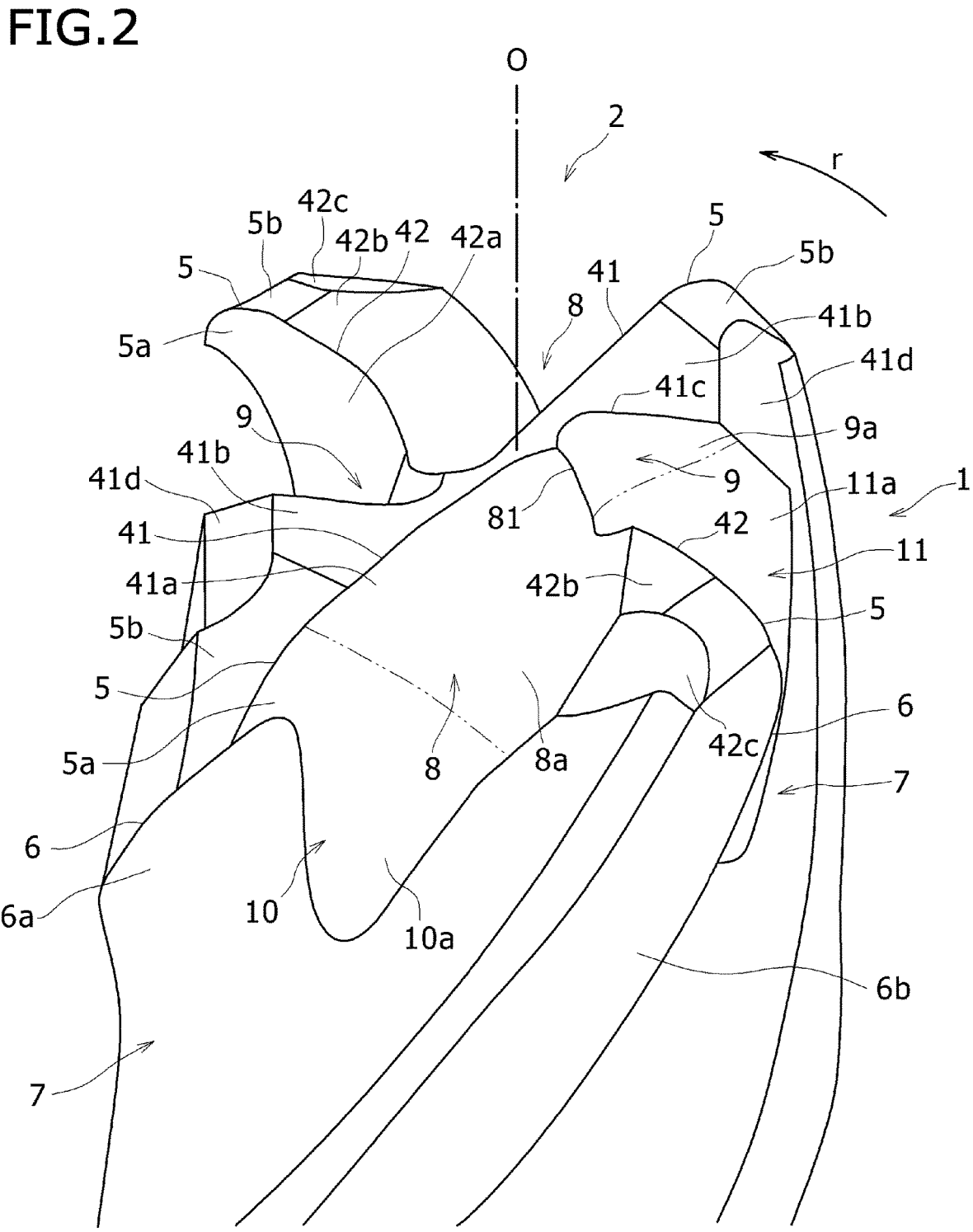
FIG. 2 is a perspective view of the end mill illustrated in FIG. 1 when viewed in the line x-x direction.
Figure 3:
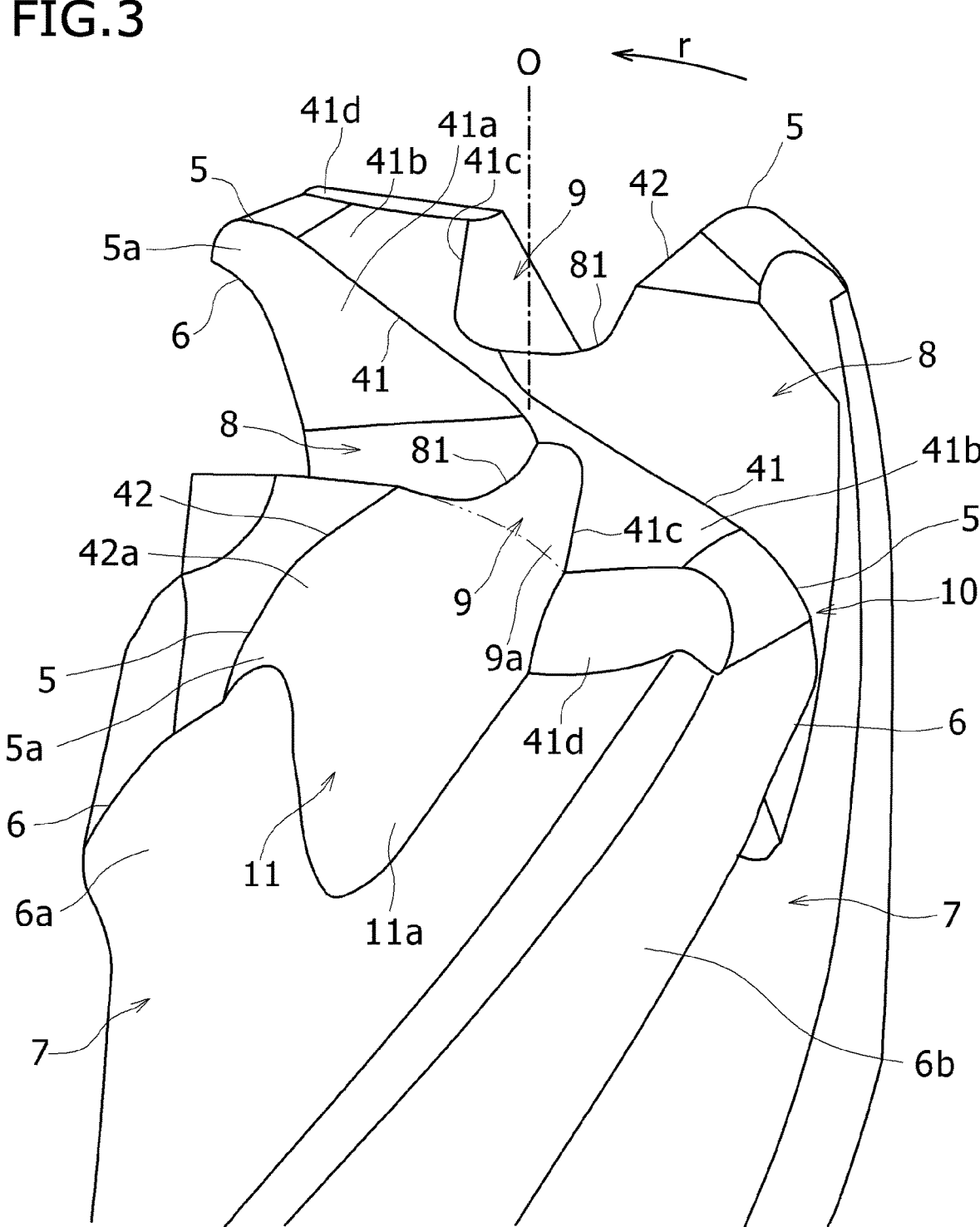
FIG. 3 is a perspective view of the end mill illustrated in FIG. 1 when viewed in the line y-y direction.

FIG. 1 to FIG. 3 illustrate a manufacturing example of an end mill 1 including a cutting edge portion 2. The cutting edge portion 2 has end cutting edges 4 as a plurality of cutting edges at a distal end portion side in a rotation axis O direction of a tool body. The end cutting edges 4 are continuous from a center side to an outer peripheral side in a radial direction when a distal end portion is viewed from a distal end face side in the rotation axis O direction and adjacently arranged in a rotation direction r of the tool body. On front sides in a rotation direction of the respective cutting edges (end cutting edges 4) adjacent in the rotation direction r of the tool body, chip discharge flutes 7 are formed. Hereinafter, the cutting edges are referred to as the end cutting edges 4. The center in the radial direction is also the rotation axis O.

On the center side in the radial direction on the front side in the rotation direction of the respective end cutting edges 4, distal end side gashes 8, 9 as distal end side depressed faces are formed. On the outer peripheral side in the radial direction on the front side in the rotation direction of the respective end cutting edges 4, rear side gashes 10, 11 as rear side depressed faces are formed. The rear side gashes 10, 11 are positioned on chip discharge flute 7 sides of the distal end side gashes 8, 9 and communicate with the distal end side gashes 8, 9 and the chip discharge flutes 7. The drawings illustrate an example in a case where the end cutting edges 4 are classified into long end cutting edges 41 and short end cutting edges 42. In the long end cutting edges 41, end portions at the center side in the radial direction of the end cutting edges 4 are positioned relatively closer to the center. In the short end cutting edges 42, end portions at the center side of the end cutting edges 4 are positioned on the outer peripheral sides in the radial direction with respect to the end portions of the long end cutting edges 41 closer to the center. However, the long end cutting edges 41 and the short end cutting edges 42 have no difference in some cases. The following describes the example in a case where the end cutting edges 4 are classified into the long end cutting edges 41 and the short end cutting edges 42.

Figure 4:
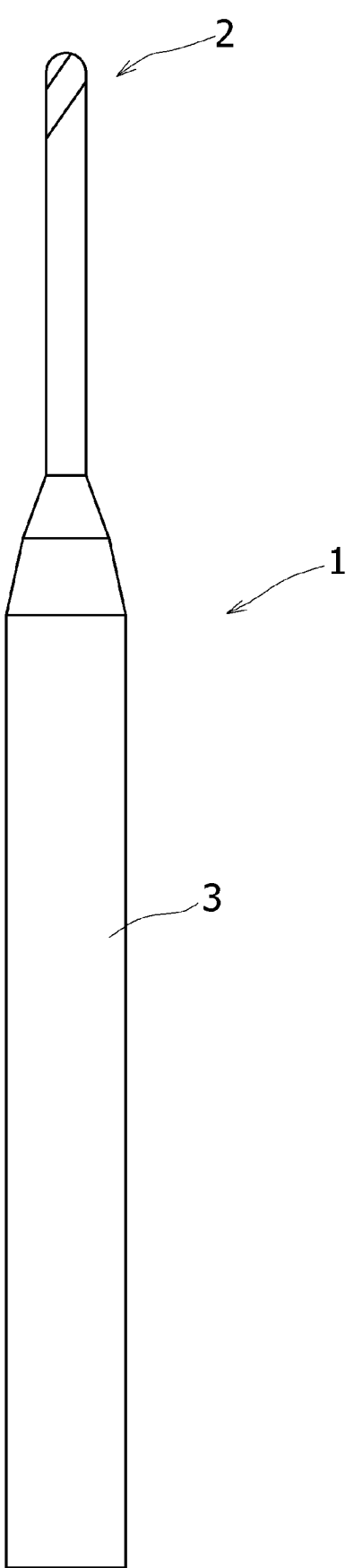
FIG. 4 is a side view illustrating the entire end mill of the present invention including a shank.

The drawings also illustrate an example of a small-diameter end mill with a long underhead length that is suitable for machining a corner portion of a mold as illustrated in FIG. 4. However, the end mill 1 of the present invention is not limited to the configuration illustrated in FIG. 4. FIG. 1 to FIG. 3 illustrate a distal end part at a cutting edge portion 2 side, excluding a shank 3 on an opposite side in an axial direction of the cutting edge portion 2 illustrated in FIG. 4. The drawings especially illustrate an example in a case where the end mill 1 is a radius end mill having corner radius edges 5 that are formed between the end cutting edges 41, 42 and peripheral cutting edges 6 and are continuous with both. However, the end mill 1 may be a square end mill that has no corner radius edges 5.

In the illustrated example, in response to the end cutting edges 4 being classified into the long end cutting edges 41 and the short end cutting edges 42, the distal end side gashes 8, 9 are classified into long cutting edge distal end side gashes 8 and short cutting edge distal end side gashes 9. The long cutting edge distal end side gashes 8 are positioned on the front sides in the rotation direction of the long end cutting edges 41. The short cutting edge distal end side gashes 9 are positioned on the front sides in the rotation direction of the short end cutting edges 42. The rear side gashes 10, 11 are classified into long cutting edge rear side gashes 10 and short cutting edge rear side gashes 11. The long cutting edge rear side gashes 10 are continuous with the chip discharge flute 7 sides of the long cutting edge distal end side gashes 8. The short cutting edge rear side gashes 11 are continuous with the chip discharge flute 7 sides of the short cutting edge distal end side gashes 9.

As illustrated in FIG. 1, the long end cutting edge 41 is continuous from the radial direction center (rotation axis) O when the cutting edge portion 2 is viewed from the distal end face side in the rotation axis O direction, or its vicinity to an end portion on the outer peripheral side. The "distal end face in the rotation axis O direction" refers to the distal end face of the tool body (end mill 1). Hereinafter, the "rotation axis O direction" is also referred to as an "axial direction," and the "distal end face" is also referred to as an "end face." Spaced in the rotation direction r of the tool body from the long end cutting edge 41, the short end cutting edge 42 is continuous from a position closer to an outer periphery with respect to a radial direction center O side when the cutting edge portion 2 is viewed from an end face side in the axial direction to the outer peripheral side.

The long end cutting edge 41 and the short end cutting edge 42 are formed so as to be paired (point-symmetric) with respect to the center (rotation axis) O. Since a part at the center O side of the long end cutting edge 41 is continuous with the center O or its vicinity, in the drawings, when the distal end portion of the tool body is viewed from the end face side, a flank 41b of the long end cutting edge 41 (hereinafter referred to as a long end cutting edge flank 41b) is made continuous with a long end cutting edge flank 41b positioned on a side across the center O in a strip shape. In this case, the long end cutting edge flanks 41b, 41b positioned on both sides with the center O sandwiched therebetween are continuous while having a width in the rotation direction r, thereby ensuring certain rigidity on the long end cutting edge 41. In the illustrated example, the "long end cutting edge flank 41b" is a long end cutting edge second face.

As illustrated in FIG. 1 and FIG. 2, the long cutting edge distal end side gash 8 is formed between a rake face 41a of the long end cutting edge 41 (hereinafter referred to as a long end cutting edge rake face 41a) and a flank 42b of the short end cutting edge 42 (hereinafter referred to as a short end cutting edge flank 42b) adjacent to the long end cutting edge 41 on the front side in the rotation direction r. The long cutting edge distal end side gash 8 faces the long end cutting edge rake face 41a and is continuous with the long end cutting edge rake face 41a. In the illustrated example, the "short end cutting edge flank 42b" is a short end cutting edge second face.

When the corner radius edges 5 are formed, as illustrated in FIG. 2 and FIG. 3, a rake face 5a of the corner radius edge 5 is continuous with the outer peripheral side in the radial direction of the long end cutting edge rake face 41a, and a rake face 6a of the peripheral cutting edge 6 is continuous with the outer peripheral side in the radial direction of the rake face 5a. The rake face 5a of the corner radius edge 5 is also continuous with the outer peripheral side in the radial direction of a rake face 42a of the short end cutting edge 42 described below, and the rake face 6a of the peripheral cutting edge 6 is continuous with the outer peripheral side in the radial direction of the rake face 5a. On a rear side in the rotation direction of the peripheral cutting edge 6, a flank (second face) 6b is formed. The long end cutting edge rake face 41a and the rake face 5a continuous with the long end cutting edge rake face 41a form a continuous identical plane (including a planar surface and a curved surface) without a boundary (boundary line). The rake face 42a of the short end cutting edge 42 and the rake face 5a continuous with the rake face 42a also form a continuous identical plane (including a planar surface and a curved surface) without a boundary (boundary line).

The long cutting edge distal end side gash 8 is composed of the long end cutting edge rake face 41a and a distal end side gash face 8a that is formed on a rear side in the rotation direction r of the short end cutting edge flank 42b positioned on the front side in the rotation direction r of the long end cutting edge 41. FIG. 1 to FIG. 3 illustrate an example in a case where the distal end side gash faces 8a clearly appear as depressed curved surfaces in the long cutting edge distal end side gashes 8 or do not clearly appear but are part of the long cutting edge distal end side gashes 8 forming the depressed curved surfaces in whole.

As illustrated in FIG. 2, the distal end side gash face 8a is formed astride the short end cutting edge flank 42b and a third face 42c (hereinafter referred to as a short end cutting edge third face 42c) formed on the rear side in the rotation direction of the short end cutting edge flank 42b. The short end cutting edge third face 42c is positioned on the rear side in the rotation direction of a flank (second face) 5b of the corner radius edge 5 continuous with the short end cutting edge 42, and therefore doubles as a third face of the corner radius edge 5.

As illustrated in FIG. 1, on the front side in the rotation direction of the short end cutting edge 42, the short cutting edge distal end side gash 9 communicating with the long cutting edge distal end side gash 8 is formed on the front side in the rotation direction of the long cutting edge distal end side gash 8. In other words, as illustrated in FIG. 3, the short cutting edge distal end side gash 9 is basically formed between the rake face 42a of the short end cutting edge 42 (hereinafter referred to as a short end cutting edge rake face 42a) or a surface (curved surface) on the front side in the rotation direction of a part continuous with the center side in the radial direction of the short end cutting edge rake face 42a, and the long end cutting edge flank 41b adjacent to the short end cutting edge 42 on the front side in the rotation direction r. As illustrated in FIG. 1 and FIG. 3, the short cutting edge distal end side gash 9 is positioned closer to the center O in the radial direction with respect to the short end cutting edge rake face 42a and is adjacent to the front side in the rotation direction r of the long cutting edge distal end side gash 8.

Since the short cutting edge distal end side gashes 9 are positioned on the front sides in the rotation direction r of the long cutting edge distal end side gashes 8, part of chips cut off by the long end cutting edges 41 and entering into the long cutting edge distal end side gashes 8 are in a state of being able to enter (go around) into the short cutting edge distal end side gashes 9. In view of this, the chips in the long cutting edge distal end side gashes 8 can be dispersed to the long cutting edge rear side gashes 10 described below, which are adjacent to the chip discharge flute 7 sides of the long cutting edge distal end side gashes 8, and the short cutting edge distal end side gashes 9.

In the illustrated example, the end cutting edges 4 are classified into the long end cutting edges 41 and the short end cutting edges 42, and the short end cutting edges 42 are formed from positions closer to the outer periphery with respect to the radial direction center O side. In response to this, as illustrated in FIG. 1 to FIG. 3, boundary lines 81, which form ridgelines convex toward the distal end face sides, appears between the long cutting edge distal end side gashes 8 and the short cutting edge distal end side gashes 9. The "part continuous with the center side in the radial direction of the short end cutting edge rake face 42a" described above is the boundary line 81 between the long cutting edge distal end side gash 8 and the short cutting edge distal end side gash 9.

The short cutting edge distal end side gash 9 is composed of the short end cutting edge rake face 42a or a surface (curved surface) on the front side in the rotation direction of the boundary line 81, and a distal end side gash face 9a that is formed on the rear side in the rotation direction r of the long end cutting edge flank 41b positioned on the front side in the rotation direction r of the short end cutting edge 42. As illustrated in FIG. 3, the short cutting edge distal end side gashes 9 do not face or are not directly continuous with the short end cutting edge rake faces 42a in some cases, and face the short end cutting edge rake faces 42a and are continuous with the short end cutting edge rake faces 42a in other cases.

FIG. 1 illustrates an example in a case where the distal end side gash faces 9a do not clearly appear as surfaces (including planar surfaces and curved surfaces) in the short cutting edge distal end side gashes 9. As illustrated in FIG. 3, the distal end side gash face 9a is formed astride the long end cutting edge flank (second face) 41b and a third face 41d (hereinafter referred to as a long end cutting edge third face 41d) formed on the rear side in the rotation direction of the long end cutting edge flank 41b. The long end cutting edge third face 41d is positioned on the rear side in the rotation direction of the flank 5b of the corner radius edge 5 continuous with the long end cutting edge 41, and therefore doubles as the third face of the corner radius edge 5. When the long end cutting edge flank 41b is divided into two, for example, the second face and the third face, the long end cutting edge third face 41d mentioned here is a fourth face.

The short cutting edge distal end side gash 9 is formed along a boundary line 41c on the short end cutting edge 42 side of the long end cutting edge flank 41b. A region of the short cutting edge distal end side gash 9, that is, a plane area of the short cutting edge distal end side gash 9 when the end face of the distal end portion (cutting edge portion 2) is viewed increases as a length of a section along the boundary line 41c increases, which increases a chip capacity. In view of this, in order to increase the chip capacity, it is appropriate that the short cutting edge distal end side gash 9 is formed along a longer section of the boundary line 41c, for example, at least half or more of a total length of the boundary line 41c. The drawings illustrate an example in a case where the short cutting edge distal end side gashes 9 are formed along the total lengths of the boundary lines 41c, that is, a case where the total lengths of the boundary lines 41c are boundary lines between the long end cutting edge flanks 41b and the short cutting edge distal end side gashes 9.

On the chip discharge flute 7 side of the short cutting edge distal end side gash 9, as illustrated in FIG. 3, the short cutting edge rear side gash 11 that is spatially continuous with the short cutting edge distal end side gash 9 and the chip discharge flute 7 and forms a different surface from the short cutting edge distal end side gash 9 is formed. The short cutting edge rear side gash 11 is positioned on the front side in the rotation direction of the short end cutting edge 42 and constitutes the short end cutting edge rake face 42a of the short end cutting edge 42. Similarly, on the chip discharge flute 7 side of the long cutting edge distal end side gash 8, as illustrated in FIG. 2, the long cutting edge rear side gash 10 that is spatially continuous with the long cutting edge distal end side gash 8 and the chip discharge flute 7 and forms a different surface from the long cutting edge distal end side gash 8 is formed. The long cutting edge rear side gash 10 is positioned on the front side in the rotation direction of the long end cutting edge 41 and constitutes the long end cutting edge rake face 41a of the long end cutting edge 41.

Basically, clear boundary lines do not appear between the short cutting edge distal end side gashes 9 and the short cutting edge rear side gashes 11. However, in FIG. 1 to FIG. 3, in order to distinguish regions of the short cutting edge distal end side gashes 9 from regions of the short cutting edge rear side gashes 11, lines corresponding to the boundary lines are indicated by two-dot chain lines for convenience. In addition, basically, clear boundary lines do not appear between the long cutting edge distal end side gashes 8 and the long cutting edge rear side gashes 10. However, in the drawings, lines corresponding to the boundary lines between the long cutting edge distal end side gashes 8 and the long cutting edge rear side gashes 10 are indicated by two-dot chain lines.

Figure 7:
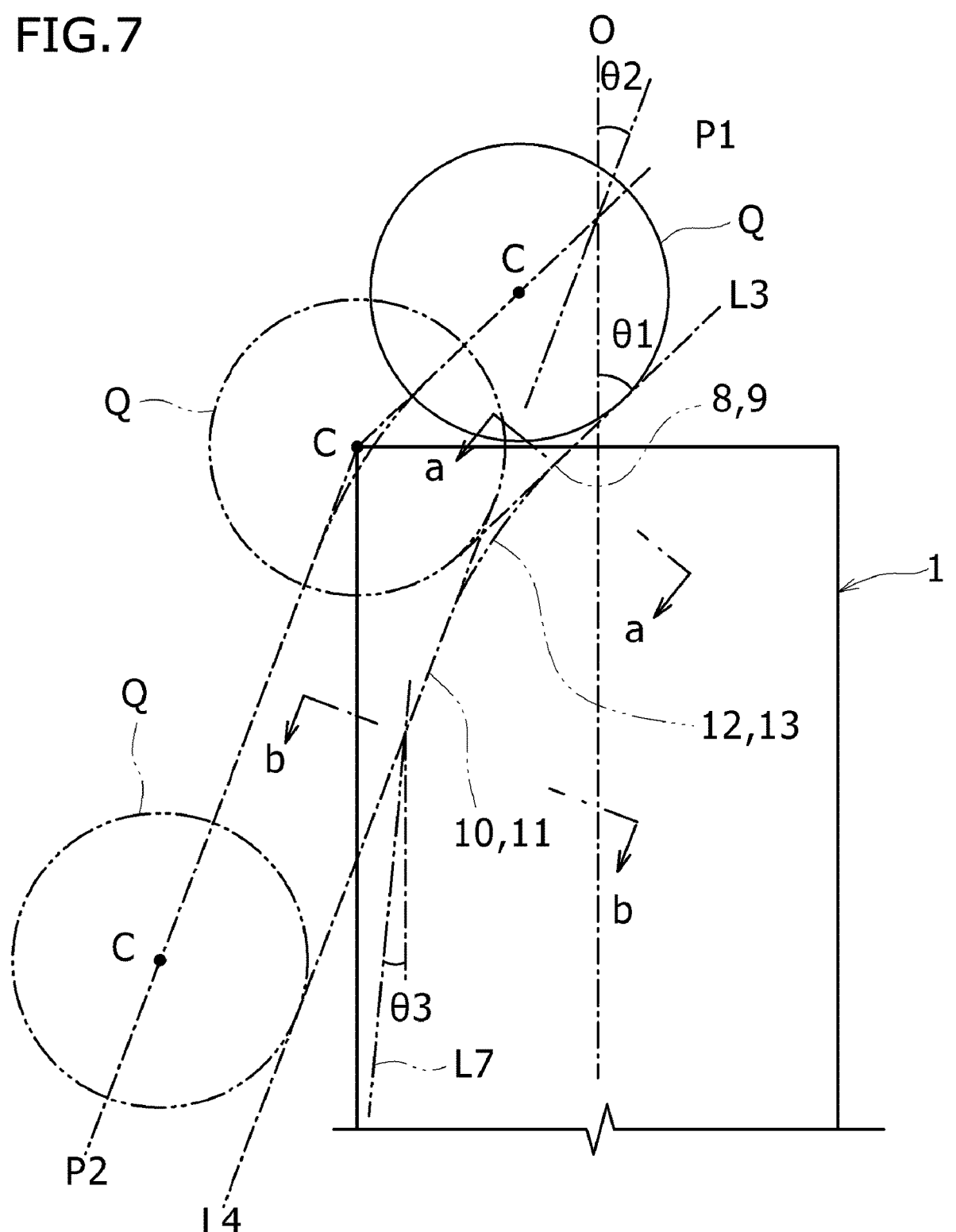
FIG. 7 is an outline elevational view illustrating a relationship between curved surfaces of distal end side depressed faces and curved surfaces of rear side depressed faces that are formed by parallel movement of the rotator as the grinding tool.

The fact that the clear boundary lines do not appear between the short cutting edge distal end side gashes 9 and the short cutting edge rear side gashes 11 and between the long cutting edge distal end side gashes 8 and the long cutting edge rear side gashes 10 can also be said that surfaces of the distal end side gashes 8, 9 and surfaces of the rear side gashes 10, 11 are connected in continuous curved surfaces. This also means that as illustrated in FIG. 7, a distal end side axis P1 and a rear side axis P2 of cylindrical surfaces described below do not intersect with a generating line L3 and a generating line L4 at an angle, and the distal end side axis P1 transitions to the rear side axis P2 and the generating line L3 transitions to the generating line L4 by drawing curved lines indicated by two-dot chain lines. The "continuous curved surfaces" include curved surfaces with a constant curvature and curved surfaces with a continuously varying curvature. The curved line indicated by the two-dot chain lines in FIG. 7 represents transition faces 12, 13 from the surfaces of the distal end side gashes 8, 9 to the rear side gashes 10, 11.

The short cutting edge rear side gash 11 faces the short end cutting edge rake face 42a, and therefore is composed of the short end cutting edge rake face 42a, and the short cutting edge distal end side gash 9 or a rear side gash face 11a that is formed on the chip discharge flute 7 side of the distal end side gash face 9a. FIG. 1 illustrates an example in a case where the rear side gash faces 11a do not necessarily clearly appear as surfaces (including planar surfaces and curved surfaces) in the short cutting edge rear side gashes 11. The long cutting edge rear side gash 10 faces the long end cutting edge rake face 41a, and therefore is composed of the long end cutting edge rake face 41a and a rear side gash face 10a that is formed on the chip discharge flute 7 side of the long cutting edge distal end side gash 8. FIG. 1 illustrates an example in a case where the rear side gash faces 10a do not necessarily clearly appear as surfaces (including planar surfaces and curved surfaces) in the long cutting edge rear side gashes 10.

FIG. 1 illustrates an example in a case where as illustrated in FIG. 3, portions (part) on the short end cutting edge 42 sides of the short cutting edge distal end side gashes 9 are formed so as to face or be continuous with the short end cutting edge rake faces 42a. In this example, part of chips cut off by the short end cutting edges 42 and to be discharged to the chip discharge flute 7 sides along the short end cutting edge rake faces 42a is in a state of being able to enter briefly into the short cutting edge distal end side gashes 9. In view of this, chip clogging caused by the chips cut off by the short end cutting edges 42, which concentrate in and enter into the short cutting edge rear side gashes 11, is easily restrained.

In the example illustrated in FIG. 1, as illustrated in FIG. 2, portions on the long end cutting edge 41 sides of the long cutting edge rear side gashes 10 are formed so as to face the long end cutting edge rake faces 41a. In this example, part of chips cut off by the long end cutting edges 41 and to be discharged to the chip discharge flute 7 sides along the long end cutting edge rake faces 41a is in a state of being able to enter directly into the long cutting edge rear side gashes 10. Therefore, since the chips cut off by the long end cutting edges 41 are easily dispersed to the long cutting edge distal end side gashes 8 and the long cutting edge rear side gashes 10, chip clogging caused by the chips concentrating in and entering into any of the long cutting edge distal end side gashes 8 and the long cutting edge rear side gashes 10 is easily restrained.

In FIG. 1, when the cutting edge portion 2 is viewed from the distal end face side, the short cutting edge rear side gashes 11 are formed such that boundary lines 91 between the short cutting edge rear side gashes 11 and the chip discharge flutes 7 intersect with the short end cutting edges

42 at positions closer to the outer periphery with respect to midpoints in a longitudinal direction of the short end cutting edges 42. In this case, when the cutting edge portion 2 is viewed from the distal end face side, portions of the chip discharge flutes 7 closer to the distal end face of the tool body are not formed to bite into the radial direction center O side of the cutting edge portion 2 but remain in positions closer to the corner radius edges 5. Therefore, rigidity of the cutting edge portion 2 as the distal end portion of the end mill 1 improves more than that in a case where the portions bite into the center O side.

Figure 6:
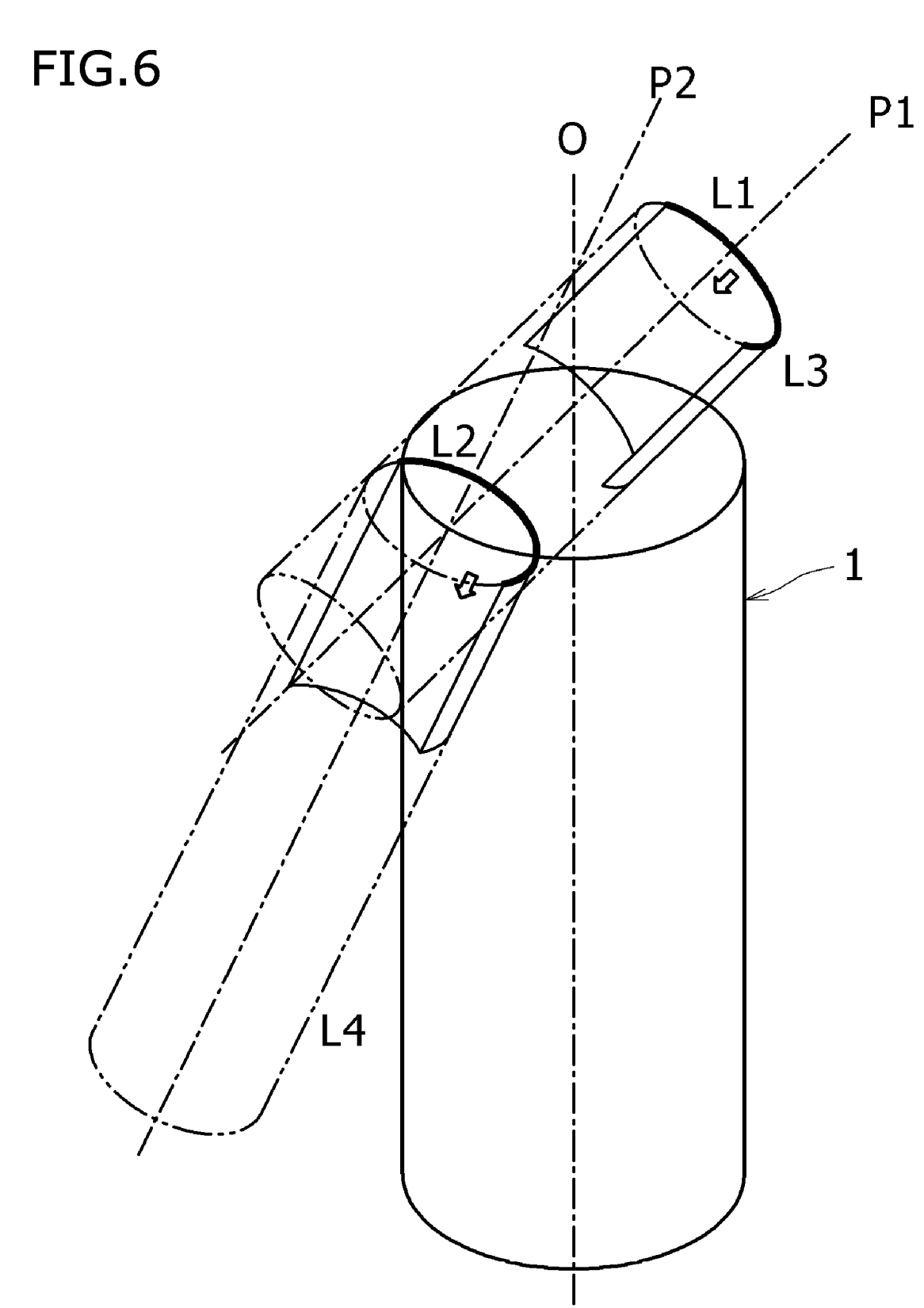
FIG. 6 is a perspective view illustrating a relationship between curved surfaces which are formed when curved lines L1, L2 move in parallel along axes (a distal end side axis and a rear side axis) P1, P2 inclined with respect to a rotation axis O of a tool body, and the rotation axis O. Here, it is supposed that the curved surfaces are cylindrical surfaces formed when a rotator as a grinding tool moves in parallel.
Figure 8A:
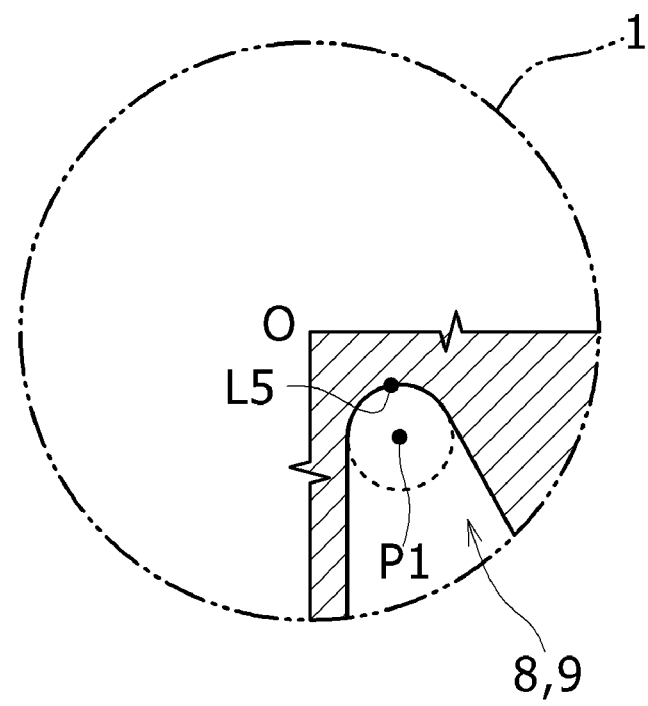
FIG. 8(*a*) is a cross-sectional view taken along the line a-a in FIG. 7, and FIG. 8(*b*) is a cross-sectional view taken along the line b-b in FIG. 7.
Figure 8B:
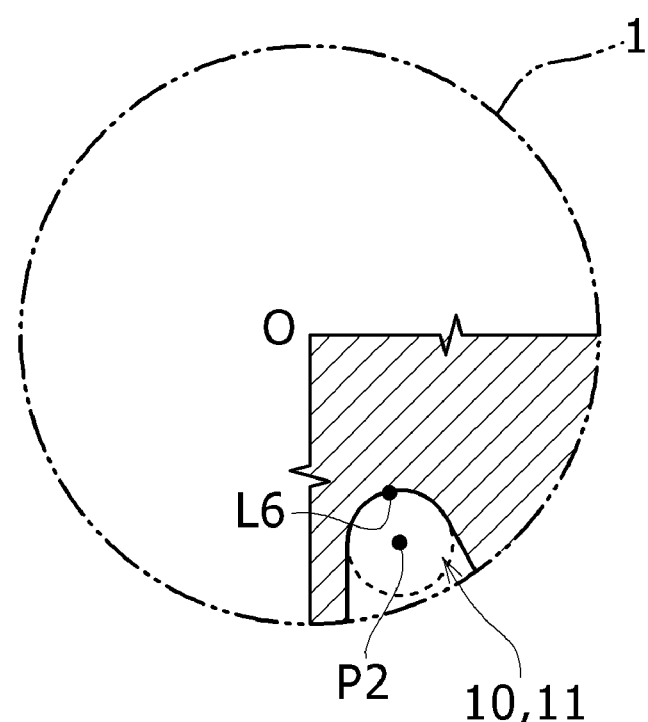

When the distal end portion of the tool body is viewed from the distal end face side in the rotation axis O direction, the surfaces of the long cutting edge distal end side gash 8 and the long cutting edge rear side gash 10 form depressed curved surfaces having an identical shape as illustrated in FIG. 6 and FIGS. 8(a) and 8(b). Similarly, the surfaces of the short cutting edge distal end side gash 9 and the short cutting edge rear side gash 11 form depressed curved surfaces having an identical shape. For easily understanding this "curved surfaces having an identical shape," the curved surfaces are described using cylindrical surfaces (columns) as curved surfaces, which are assumed to form part of the surfaces of the gashes, illustrated in FIG. 6 for convenience.

The curved surfaces of the distal end side gashes 8, 9 are curved surfaces formed by a trajectory when a curved line L1 convex toward the rear side (shank 3 side) in the rotation axis O direction of the tool body moves in parallel along the distal end side axis P1 while keeping a certain distance from the distal end side axis P1 as illustrated in FIG. 6. The distal end side axis P1 makes an acute angle θ1 with the rotation axis O. The curved surfaces of the rear side gashes 10, 11 are curved surfaces formed by a trajectory when a curved line L2 convex toward the rotation axis O side moves in parallel along the rear side axis P2 while keeping a certain distance from the rear side axis P2. The rear side axis P2 makes a smaller acute angle θ2 with the rotation axis O than the distal end side axis P1.

FIG. 6 also illustrates, for simplification, a state where the generating lines L3, L4 of the curved surfaces (cylindrical surfaces) are inclined with respect to the rotation axis O when it is supposed (assumed) that the curved surfaces forming the surfaces of the distal end side gashes 8, 9 and the rear side gashes 10, 11 are cylindrical surfaces (column surfaces) having the axes P1, P2 inclined with respect to the rotation axis O. An axis and a generating line of the cylindrical surface as the curved surfaces forming the distal end side gashes 8, 9 are P1 and L3, respectively. An axis and a generating line of the cylindrical surface as the curved surfaces forming the rear side gashes 10, 11 are P2 and L4, respectively. Note that when the generating lines L3, L4 move in parallel around the axes P1, P2, the curved surfaces formed (traced) by the generating lines L3, L4 or drawn by trajectories of the generating lines L3, L4 are the cylindrical surfaces illustrated in FIG. 6.

The distal end side axis P1 and the rear side axis P2 illustrated in FIG. 6 become trajectories when a rotation axis C of a rotator Q as a grinding tool illustrated in FIG. 7 moves in parallel. While FIG. 6 and FIG. 7 illustrate, for simplification, the axes P1, P2 and the generating lines L3, L4 (parallel movement directions of the rotator Q) intersecting with the rotation axis O, the axes P1, P2 and the generating lines L3, L4 need not necessarily intersect with the rotation axis O. The rotator Q corresponds to a grinding tool that is assumed to grind the tool body and form the gashes.

As described above, when the distal end portion of the tool body is viewed from the distal end face side in the rotation axis O direction, the shapes of the surfaces of the long cutting edge distal end side gash 8 and the long cutting edge rear side gash 10 that are continuous in the radial direction form an identical curved surface, and the shapes of the surfaces of the short cutting edge distal end side gash 9 and the short cutting edge rear side gash 11 form an identical curved surface. In this relation, the cylindrical surface having the distal end side axis P1 assuming the distal end side gashes 8, 9 and the cylindrical surface having the rear side axis P2 assuming the rear side gashes 10, 11 illustrated in FIG. 6 have an identical size. The fact that the surfaces of the distal end side gashes 8, 9 and the surfaces of the rear side gashes 10, 11 both form curved surfaces having identical shapes is represented in FIG. 8(*a*) that is a cross-sectional view taken along the line a-a in FIG. 7 and FIG. 8(*b*) that is a cross-sectional view taken along the line b-b in FIG. 7.

FIG. 8(*a*) illustrates a cross-sectional surface in a direction perpendicular to the distal end side axis P1 (generating line L3) for the surfaces of the distal end side gashes 8, 9. FIG. 8(*b*) illustrates a cross-sectional surface in a direction perpendicular to the rear side axis P2 (generating line L4) for the surfaces of the rear side gashes 10, 11. As illustrated here, the curved surfaces formed by the surfaces of the rear side gashes 10, 11 are part of the curved surfaces formed by the surfaces of the distal end side gashes 8, 9. The surfaces (curved surfaces) of the rear side gashes 10, 11 have shapes overlapping with the surfaces (curved surfaces) of the distal end side gashes 8, 9. Although a cross-sectional shape of the tool body is an ellipse on the cross-sectional surface taken along the line a-a in FIG. 7 and the cross-sectional surface taken along the line b-b in FIG. 7 in a precise sense, it is illustrated as a circular cross-sectional surface in FIG. 8 for simplification.

Thus, the surfaces of the distal end side gashes 8, 9 and the surfaces of the rear side gashes 10, 11 are determined according to the shape of the rotator Q and the direction of the parallel movement. The shapes of the curved surfaces are arbitrary except that the surfaces (curved surfaces) of the rear side gashes 10, 11 and the surfaces (curved surfaces) of the distal end side gashes 8, 9 have shapes overlapping with one another. The "shapes overlapping with one another" do not mean a state of overlapping arrangement, but mean shapes that overlap when the respective surfaces are stacked on the supposition that they can be taken out. The gist is not that the entire surfaces (curved surfaces) overlap, but rather that it is only necessary that at least part of the surfaces (curved surfaces) overlaps.

The surfaces (curved surfaces) of the rear side gashes 10, 11 and the surfaces (curved surfaces) of the distal end side gashes 8, 9 have shapes overlapping with one another. Therefore, flows of chips passing through the distal end side gashes 8, 9 and flows of chips passing through the rear side gashes 10, 11 are aligned, the chips do not mutually obstruct the courses, and the respective chips smoothly flow and are promptly discharged to the chip discharge flutes 7. In view of this, even when the distal end side gashes 8, 9 are shaped to have relatively larger core diameters than core diameters of the rear side gashes 10, 11 and relatively smaller volumes than volumes of the rear side gashes 10, 11 for the purpose of ensuring rigidity of the distal end portion of the tool body, accumulation of the chips in the distal end side gashes 8, 9 can be restricted. Accordingly, chip dischargeability can be improved compared with a conventional one while the rigidity of the distal end portion of the tool body is maintained.

In particular, when the distal end side axis P1 and the rear side axis P2 as references of the curved surfaces forming the surfaces of the distal end side gashes 8, 9 and the rear side gashes 10, 11 are positioned on an identical planar surface as described above, the chips in the distal end side gashes 8, 9 are discharged to the chip discharge flutes 7 taking shortest ways. Additionally, as illustrated in FIGS. 8(*a*) and 8(*b*), when a line L5 passing through deepest positions on the surfaces of the distal end side gashes 8, 9 and a line L6 passing through deepest positions on the surfaces of the rear side gashes 10, 11 are on an identical straight line, the line L5 and the line L6 make one straight line. Therefore, the chips in the distal end side gashes 8, 9 are discharged to the chip discharge flutes 7 taking further shortest ways. The line L5 and the line L6 are the generating lines L3, L4, respectively, and basically straight lines.

Since the curved surfaces of the distal end side gashes 8, 9 and the curved surfaces of the rear side gashes 10, 11 are not limited to cylindrical surfaces, it is not always true that the curvatures of the respective curved surfaces or the curved lines on the cross-sectional surfaces illustrated in FIG. 8 are constant. However, for example, when the curvature of the deepest portion of a gash is the largest, the volume of the gash increases, and therefore the chip capacity increases. In addition, a straight line including the line L5 passing through the deepest positions on the surfaces of the distal end side gashes 8, 9 and a straight line including the line L6 passing through the deepest positions on the surfaces of the rear side gashes 10, 11 are easily identified, and the line L5 and the line L6 are easily positioned on an identical line. Therefore, the chip dischargeability in the distal end side gashes 8, 9 and in the rear side gashes 10, 11 are easily enhanced.

The two cylindrical surfaces indicated by two-dot chain lines in FIG. 6 represent curved surfaces formed by tracing (sliding on) and scraping off the tool body by the surface of the rotator Q as a grinding tool illustrated in FIG. 7 when the rotator Q moves in parallel while the rotation axis C of the rotator Q maintains a constant angle with respect to the rotation axis O of the tool body as described above. The trajectories when the rotation axis C of the rotator Q moves in parallel are the axes P1, P2 in FIG. 6. Supposing that the curved surface traced by the surface of the rotator Q is a cylindrical surface when the rotator Q moves in parallel, the rotator Q is a spherical body. However, the actual shape of the rotator Q (grinding tool) is arbitrary and may be a cone shape, a shape in which the cone shape is deformed, or the like.

FIG. 7 illustrates a state in which the distal end side gashes 8, 9 and the rear side gashes 10, 11 are formed when it is supposed that the curved surfaces forming the surfaces of the distal end side gashes 8, 9 and the rear side gashes 10, 11 are formed by the parallel movement of the rotator Q (grinding tool).

While FIG. 7 illustrates an example in a case where the rotation axis C of the rotator Q faces a direction perpendicular to the rotation axis O of the tool body, the direction (angle) of the rotation axis C with respect to the direction of the rotation axis O is arbitrary. As described above, when the straight line including the line L5 passing through the deepest positions on the surfaces of the distal end side gashes 8, 9 and the straight line including the line L6 passing through the deepest positions on the surfaces of the rear side gashes 10, 11 are on an identical line, the axis P1 and the axis P2 or the generating line L3 and the generating line L4 in FIG. 7 are positioned on an identical planar surface. However, it is not necessarily required, and the axis P1 and the axis P2 or the generating line L3 and the generating line L4 may be positioned on different planar surfaces.

As illustrated in FIG. 7, a direction of the parallel movement of the rotation axis C when the rotator Q forms the distal end side gashes 8, 9 and a direction of the parallel movement of the rotation axis C when the rotator Q forms the rear side gashes 10, 11 are different. An angle made by the direction of the parallel movement when the rear side gashes 10, 11 are formed and the rotation axis O is smaller. This is to change the angle in stages to guide the chips in the distal end side gashes 8, 9 until they transition into the chip discharge flutes 7.

Figure 5:
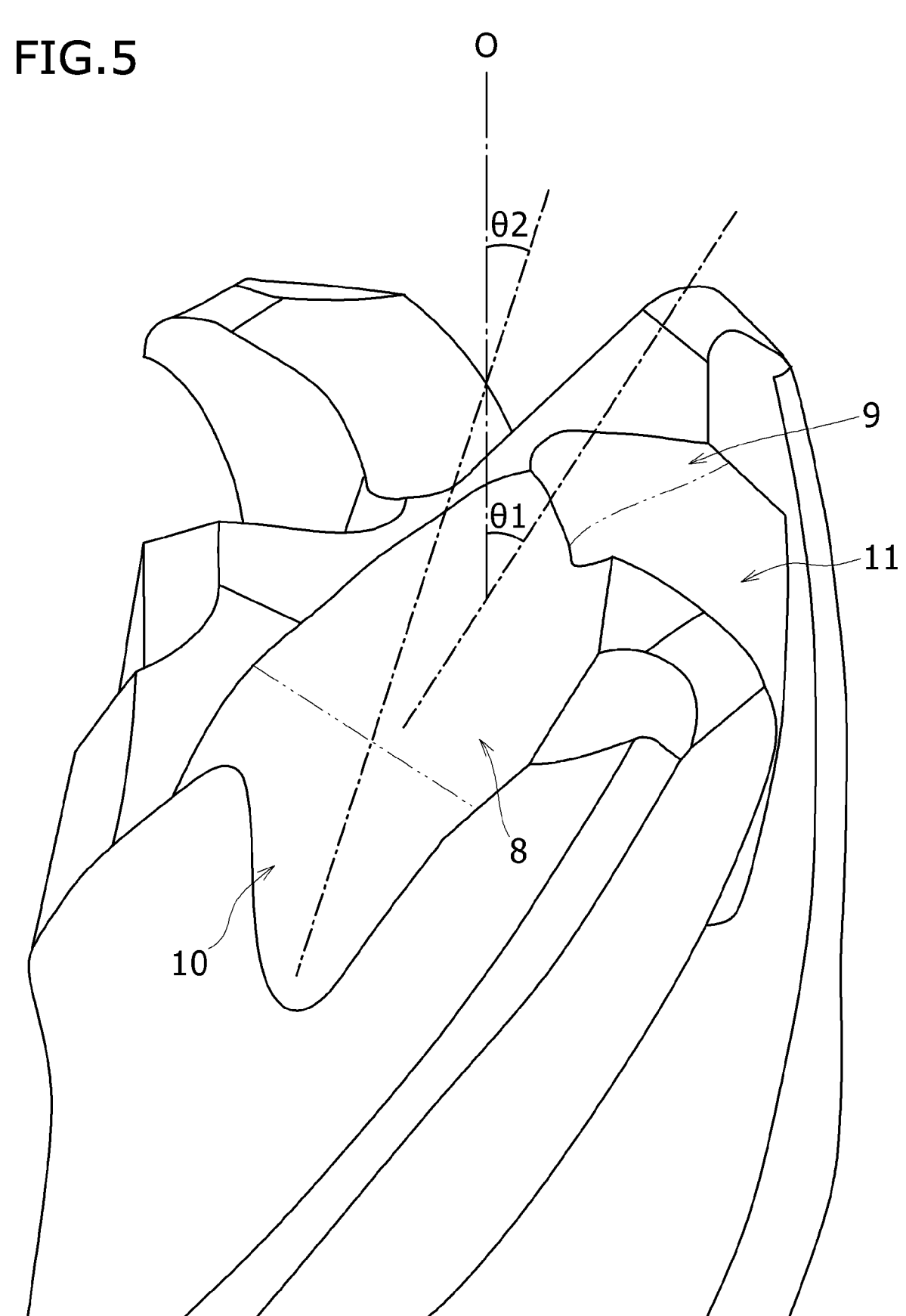
FIG. 5 is a perspective view illustrating a relationship between an angle θ1, which is made by a line passing through a deepest position on a curved surface forming a surface of a distal end side depressed face and a rotation axis, and an angle θ2, which is made by a line passing through a deepest position on a surface of a rear side depressed face and the rotation axis.

The direction of the parallel movement of the rotation axis C when the rotator Q forms the distal end side gashes 8, 9 is a direction of the axis P1 of the cylindrical surface illustrated in FIG. 6. The direction of the parallel movement of the rotation axis C when the rotator Q forms the rear side gashes 10, 11 is a direction of the axis P2 of the cylindrical surface illustrated in FIG. 6. An acute angle made by the direction of the parallel movement when the rotator Q forms the distal end side gashes 8, 9 and the rotation axis O is θ1 as illustrated in FIG. 5 and FIG. 7. An acute angle made by the direction of the parallel movement when the rotator Q forms the rear side gashes 10, 11 and the rotation axis O is θ2. For reference, as illustrated in FIG. 7, when an angle made by a straight line L7 including a line passing through deepest positions on the surfaces of the chip discharge flutes 7 illustrated in FIG. 2 and FIG. 3 and the rotation axis O is θ3, then θ3<θ2. To summarize, the respective angles have a relationship of θ3<θ2<θ1.

DESCRIPTION OF REFERENCE SIGNS

1 . . . end mill (tool body)
2 . . . cutting edge portion
3 . . . shank
41 . . . long end cutting edge
41a . . . long end cutting edge rake face
41b . . . long end cutting edge flank (second face)
41c . . . boundary line on short end cutting edge 42 side of flank 41b of long end cutting edge 41
41d . . . long end cutting edge third face
42 . . . short end cutting edge
42a . . . short end cutting edge rake face
42b . . . short end cutting edge flank (second face)
42c . . . short end cutting edge third face
5 . . . corner radius edge
5a . . . rake face of corner radius edge
5b . . . flank of corner radius edge
6 . . . peripheral cutting edge
6a . . . rake face of peripheral cutting edge
6b . . . flank of peripheral cutting edge
7 . . . chip discharge flute
71 . . . boundary line on cutting edge portion 2 side of chip discharge flute 7
8 . . . long cutting edge distal end side gash (long cutting edge distal end side depressed face)
8a . . . distal end side gash face
81 . . . boundary line of long cutting edge distal end side gash 8 closer to short cutting edge distal end side gash 9 (between long cutting edge distal end side gash 8 and short cutting edge distal end side gash 9)
9 . . . short cutting edge distal end side gash (short cutting edge distal end side depressed face)
9a . . . distal end side gash face 91 . . . boundary line between short cutting edge rear side gash 11 and chip discharge flute 7 when cutting edge portion 2 is viewed from distal end face side
10 . . . long cutting edge rear side gash (long cutting edge rear side depressed face)
10a . . . rear side gash face
11 . . . short cutting edge rear side gash (short cutting edge rear side depressed face)
11a . . . rear side gash face
12 . . . transition face from long cutting edge distal end side depressed face (long cutting edge distal end side gash) 8 to long cutting edge rear side depressed face (long cutting edge rear side gash) 10
13 . . . transition face from short cutting edge distal end side depressed face (short cutting edge distal end side gash) 9 to short cutting edge rear side depressed face (short cutting edge rear side gash) 11
P1 . . . axis (distal end side axis) of curved surface (cylindrical surface) assuming distal end side gashes 8, 9
L1 . . . curved line convex toward rear side in rotation axis O direction
L3 . . . generating line of curved surface (cylindrical surface) assuming distal end side gashes 8, 9
P2 . . . axis (rear side axis) of curved surface (cylindrical surface) assuming rear side gashes 10, 11
L2 . . . curved line convex toward rotation axis O side
L4 . . . generating line of curved surface (cylindrical surface) assuming rear side gashes 10, 11
Q . . . rotator
C . . . rotation axis of rotator
L5 . . . line passing through deepest positions on surfaces of distal end side gashes 8, 9
L6 . . . line passing through deepest positions on surfaces of rear side gashes 10, 11
L7 . . . straight line including line passing through deepest position on surface of chip discharge flute 7

The invention claimed is:

1. An end mill comprising:
at a distal end portion side in a rotation axis direction of a tool body, a plurality of cutting edges continuous from a center side to an outer peripheral side in a radial direction when the distal end portion is viewed from a distal end face side in the rotation axis direction, the plurality of cutting edges being adjacently arranged in a rotation direction of the tool body; a gash formed on a front side in a rotation direction of each of the cutting edges; and a chip discharge flute continuous from the gash to a rear side in the rotation axis direction, wherein
the gash includes a distal end side depressed face formed along a distal end side axis P1 making an acute angle with a rotation axis O and from the end cutting edges or from the rear side in the rotation direction of cutting edge flank when the distal end side axis P1 is viewed such that it intersects with the rotation axis O and passes through deepest positions on the surfaces of the gash, and a rear side depressed face adjacent to the rear side in the rotation axis direction of the distal end side depressed face and formed along a rear side axis making a smaller acute angle with the rotation axis than the distal end side axis and to the chip discharge flute when the distal end side axis P1 is viewed such that it intersects with the rotation axis O and passes through deepest positions on the surfaces of the gash, and
the distal end side depressed face and the rear side depressed face have a depressed curved surface and have shapes overlapping with one another and form curved surfaces having an identical shape.

2. The end mill according to claim 1, wherein the distal end side depressed face and the rear side depressed face are connected in a continuous curved surface.

3. The end mill according to claim 1, wherein the distal end side axis and the rear side axis are positioned on an identical planar surface.

4. The end mill according to claim 3, wherein when viewed in an in-plane direction of the planar surface of a plane containing the distal end side axis P1 and the rear side axis P2, a line passing through a deepest position on a surface of the distal end side depressed face and a line passing through a deepest position on a surface of the rear side depressed face are on an identical straight line.

5. The end mill according to claim 1, wherein the distal end side depressed face forms a curved surface when a curved line convex toward the rear side in the rotation axis direction of the tool body moves in parallel along the distal end side axis while keeping a certain distance from the distal end side axis, the distal end side axis making an acute angle with the rotation axis, and the rear side depressed face forms a curved surface when a curved line convex toward the rotation axis side moves in parallel along the rear side axis while keeping a certain distance from the rear side axis, the rear side axis making a smaller acute angle with the rotation axis than the distal end side axis.

6. A method for manufacturing the end mill according to claim 1, the method comprising:

while rotating a grinding tool that is a rotator around a rotation axis of the rotator facing in a direction intersecting the rotation axis Q with respect to a columnar tool body, moving a surface of the grinding tool parallel to the distal end side axis to form the distal end side depressed face, and while keeping the rotating of the grinding tool around the rotation axis of the rotator, moving the surface of the grinding tool parallel to the rear side axis to form the rear side depressed face.

* * * * *